US006497304B1

(12) United States Patent
Leipziger

(10) Patent No.: US 6,497,304 B1
(45) Date of Patent: Dec. 24, 2002

(54) STEP LADDER

(76) Inventor: Herb Leipziger, 215 Birchwood Rd., Coram, NY (US) 11727

(*) Notice: Subject to any disclaimer, the term of this patent is extended or adjusted under 35 U.S.C. 154(b) by 58 days.

(21) Appl. No.: 09/707,423

(22) Filed: Nov. 7, 2000

(51) Int. Cl.$^{7}$ .................................................. B32B 3/10
(52) U.S. Cl. ......................... 182/194; 428/99; 428/120; 428/139
(58) Field of Search .......................... 428/99, 120, 139; 280/169; 182/194, 230; 52/177, 181

(56) References Cited

U.S. PATENT DOCUMENTS 4,316,524 A * 2/1982 Lapeyre ...................... 182/194
5,286,049 A * 2/1994 Khan ......................... 280/163
5,692,581 A * 12/1997 Nelson et al. .............. 182/230

* cited by examiner

*Primary Examiner*—Alexander S. Thomas

(57) ABSTRACT

An improved step ladder of a type having at least one step and a corresponding number of step pads. The improvement includes each step pad being replaceably and interchangeably attached to an associated step, each step having a plurality of throughbores extending vertically therethrough, each step pad having a plurality of tits depending. therefrom that replaceably and interchangeably engage in the plurality of throughbores in the associated step, respectively, and each tit having a wide base coincident with the associated step pad, a pointed tip that facilitates entering into an associated throughbore, and a pinched waist which is releasably captured in the associated throughbore when the pointed tip passes into the associated throughbore, a distance requiring the tit to compress so as to allow the pinched waist to receive the step and then expand to releasably capture the step in the pinched waist, and as a result thereof, releasably lock the step pad onto the associated step.

4 Claims, 1 Drawing Sheet

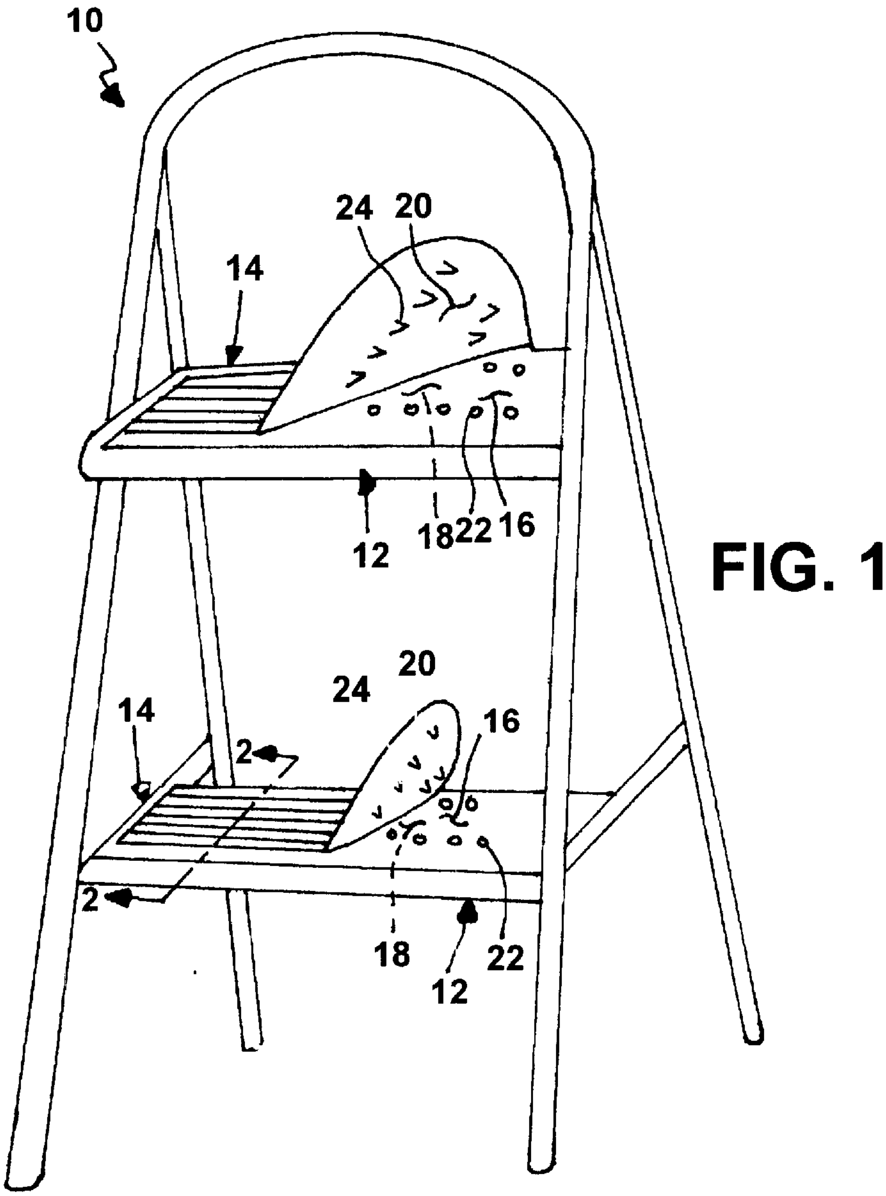
FIG. 1
FIG. 3
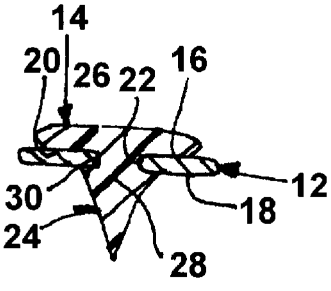
FIG. 2
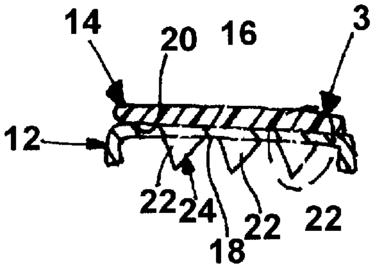

STEP LADDER

BACKGROUND OF THE INVENTION

1. Field of the Invention

The present invention relates to a step ladder. More particularly, the present invention relates to an improved step ladder.

2. Description of the Prior Art

Numerous innovations for step related devices have been provided in the prior art that will be described. Even though these innovations may be suitable for the specific individual purposes to which they address, however, they differ from the present invention.

FOR EXAMPLE, U.S. Pat. No. 4,029,280 to Golz teaches a pair of screen or storm sash supporting attachments in the form of wooden blocks that are releasably secured on the step of a step ladder by U-shaped brackets. The forward ends of the attachments being provided with a plurality of spaced sash-holding lugs with anti-slip treads therebetween for holding the lower end of a screen or storm window sash from outward sliding movement.

ANOTHER EXAMPLE, U.S. Pat. No. 5,103,608 to Andreo teaches an improved stair nosing device especially useful in temporarily darkened stairways which includes a plate member with an upper surface, at least a portion of which is covered by luminescent material. The stair nosing device includes non-slip material attached to the upper surface to provide increased frictional contact with foot traffic relative to the plate member. The non-slip material is attached as spaced apart strips with an upper surface of the non-slip material being higher relative to the plate member. In this way the luminescent material is protected from damage by foot traffic.

STILL ANOTHER EXAMPLE, U.S. Pat. No. 5,111,908 to Reiter et al. teaches a pipe step for providing a flat supporting surface on the top side of a horizontal pipe. The step includes a pair of channel members each having arcs cut in the flange portions thereof to meet with the pipe. U-bolts are provided for clamping the channel members to the pipe. A flat-supporting surface formed from square mesh grating is bolted to, and extends between, the upper web portions of the channel members and provides a non-slip flat supporting surface.

YET ANOTHER EXAMPLE, U.S. Pat. No. 5,587,218 to Betz teaches an improved surface covering that includes a base having a plurality of receiving grooves on one side and a plurality of working grooves on the other side. Each receiving groove includes gripping projections and is constructed to receive, and grip, a filler material. To assemble the surface material, the base material is flexed so that the size of the receiving grooves is enlarged thereby making insertion of the filler material easy. The base material is then returned to its original planar configuration, so that the size of the receiving grooves is retracted thereby causing the gripping projection to grip and hold the filler material.

STILL YET ANOTHER EXAMPLE, U.S. Pat. No. 6,088,976 to Roy teaches a removable non-skid pad that covers a portion of a corresponding step of an exterior stair or staircase so as to allow people to use it more safely. The pad includes a main section to be disposed on the upper horizontal portion of the step, a preformed substantially hooked-shaped form section having one end integrally connected to the front end of the main section so as to fit around the front edge and a part of the bottom portion of the step near the front edge, and a rear section having one end integrally connected to the rear end of the main section. A binding assembly is provided to removably attach the front and rear sections under the step. The pad may be easily installed and removed. Any snow or ice accumulations may be easily dislodged by removing the pad and skating it.

It is apparent that numerous innovations for step related devices have been provided in the prior art that are adapted to be used. Furthermore, even though these innovations may be suitable for the specific. individual purposes to which they address, however, they would not be suitable for the purposes of the present invention as heretofore described.

SUMMARY OF THE INVENTION

ACCORDINGLY, AN OBJECT of the present invention is to provide an improved step ladder that avoids the disadvantages of the prior art.

ANOTHER OBJECT of the present invention is to provide an improved step ladder that is simple and inexpensive to manufacture.

STILL ANOTHER OBJECT of the present invention is to provide an improved step ladder that is simple to use.

BRIEFLY STATED, YET ANOTHER OBJECT of the present invention is to provide an improved step ladder of a type having at least one step and a corresponding number of step pads. The improvement includes each step pad being replaceably and interchangeably attached to an associated step, each step having a plurality of throughbores extending vertically therethrough, each step pad having a plurality of tits depending therefrom that replaceably and interchangeably engage in the plurality of throughbores in the associated step, respectively, and each tit having a wide base coincident with the associated step pad, a pointed tip that facilitates entering into an associated throughbore, and a pinched waist which is releasably captured in the associated throughbore when the pointed tip passes into the associated throughbore, a distance requiring the tit to compress so as to allow the pinched waist to receive the step and then expand to releasably capture the step in the pinched waist, and as a result thereof, releasably lock the step pad on the associated step.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures of the drawing are briefly described as follows:

FIG. 1 is a diagrammatic perspective view of the present invention in use;

FIG. 2 is an enlarged diagrammatic cross sectional view taken along LINE 2—2 in FIG. 1; and FIG. 3 is an enlarged diagrammatic elevational view of the area generally enclosed by the dotted curve identified by ARROW 3 in FIG. 2 of a tit of a step pad of the present invention.

LIST OF REFERENCE NUMERALS UTILIZED IN THE DRAWING

10 improved step ladder of present invention
12 at least one step
14 corresponding number of step pads
16 top surface of each step of at least one step 12

18 bottom surface of each step of at least one step 12
20 bottom surface of step pad of corresponding number of step pads 14
22 plurality of throughbores in each step of at least one step 12
24 plurality of tits of each step pad of corresponding number of step pads 14
26 wide base of each tit of plurality of tits 24 of each step pad of corresponding number of step pads 14
28 pointed tip of each tit of plurality of tits 24 of each step pad of corresponding number of step pads 14
30 pinched waist of each tit of plurality of tits 24 of each step pad of corresponding number of step pads 14

DESCRIPTION OF THE PREFERRED EMBODIMENT

Referring now to the figures, in which like numerals indicate like parts, and particularly to FIG. 1, which is a diagrammatic perspective view of the present invention in use, the improved step ladder of the present invention is shown generally at 10.

The improved step ladder 10 is of a type having at least one step 12 and a corresponding number of step pads 14.

Each step 12 has a top surface 16 and a bottom surface 18.

Each step pad 14 has a bottom surface 20 abutting the top surface 16 of an associated step 12.

The improvement of the improved step ladder 10 can best be seen in FIGS. 1–3, which are, respectively, a diagrammatic perspective view of the present invention in use, an enlarged diagrammatic cross sectional view taken along LINE 2—2 in FIG. 1, and an enlarged diagrammatic elevational view of the area generally enclosed by the dotted curve identified by ARROW 3 in FIG. 2 of a tit of a step pad of the present invention, and as such, will be discussed with reference thereto.

The improvement comprises each step pad 14 being replaceably and interchangeably attached to an associated step 12.

The improvement further comprises each step 12 having a plurality of throughbores 22 extending vertically therethrough, from the top surface 16 thereof, to the bottom surface 18 thereof.

The improvement further comprises the plurality of throughbores 22 in each step 12 being equally spaced-apart from each other.

The improvement further comprises each step pad 14 having a plurality of tits 24 depending from the bottom surface 20 thereof, and which replaceably and interchangeably engage in the plurality of throughbores 22 in the associated step 12, respectively.

The improvement further comprises the plurality of tits 24 of each step pad 14 depending equally spaced-apart from each other.

The improvement further comprises each tit 24 having a wide base 26 coincident with the bottom surface 20 of an associated step pad 14.

The improvement further comprises each tit 24 further having a pointed tip 28 that is narrower than the wide base 26 thereof so as to facilitate entering into an associated throughbore 22.

The improvement further comprises each tit 24 being resilient.

The improvement further comprises each tit 24 further having a pinched waist 30 that is disposed between the wide base 26 thereof and the pointed tip 28 thereof, and which is releasably captured in the associated throughbore 22 when the pointed tip 28 of the tit 24 passes into the associated throughbore 22, a distance requiring the tit 24 to compress so as to allow the pinched waist 30 of the tit 24 to receive the step 12 and then expand to releasably capture the step 12 in the pinched waist 30 of the tit 24, and as a result thereof, releasably lock the step pad 14 onto the associated step 12.

It will be understood that each of the elements described above, or two or more together, may also find a useful application in other types of constructions differing from the types described above.

While the invention has been illustrated and described as embodied in an improved step ladder, however, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

What is claimed is:

1. An improved step ladder having at least one step and a corresponding number of step pads, wherein each step has a top surface and a bottom surface, and each step pad has a bottom surface abutting the top surface of an associated step, said improvement comprising each step pad being replaceably and interchangeably attached to an associated step, wherein said improvement further comprises each step having a plurality of throughbores extending vertically therethrough, from the top surface thereof, to the bottom surface thereof;

wherein said improvement further comprises each step pad having a plurality of tits depending from the bottom surface thereof, and which replaceably and interchangeably engage in said plurality of throughbores in the associated step, respectively;

wherein said improvement further comprises each tit being resilient;

wherein said improvement further comprises each tit having a wide base coincident with the bottom surface of an associated step pad;

wherein said improvement further comprises each tit further having a pointed tip that is narrower than said ,wide base thereof so as to facilitate entering into an associated throughbore; and wherein said improvement further comprises said pointed tip of each tit being free of voids.

2. The improved step ladder as defined in claim 1, wherein said improvement further comprises said plurality of throughbores in each step being equally spaced-apart from each other.

3. The improved step ladder as defined in claim 1, wherein said improvement further comprises said plurality of tits of each step pad depending equally spaced-apart from each other.

4. The improved step ladder as defined in claim 1, wherein said improvement further comprises each tit further having a pinched waist that is disposed between said wide base thereof and said pointed tip thereof, and which is releasably captured in said associated throughbore when the pointed tip of said tit passes into said associated throughbore, a distance requiring said tit to compress so as to allow said pinched waist of said tit to receive the step and then expand to releasably capture the step in said pinched waist of said tit, and as a result thereof, releasably lock said step pad onto the associated step.

* * * * *